(12) United States Patent
Arrieta et al.

(10) Patent No.: US 6,626,193 B1
(45) Date of Patent: Sep. 30, 2003

(54) MACHINE USABLE FOR WASHING SCRAPS OF FIBROUS MATERIAL, WHICH HAVE BEEN IMPREGNATED WITH RESIN

(75) Inventors: Agustin P. Arrieta, Amorebieta-Bizkaia (ES); Koldo G. Zubieta, Bilbao-Bizkaia (ES)

(73) Assignee: Vetrotex France S.A., Chambery (FR)

( * ) Notice: Subject to any disclaimer, the term of this patent is extended or adjusted under 35 U.S.C. 154(b) by 0 days.

(21) Appl. No.: 09/545,512

(22) Filed: Apr. 7, 2000

(30) Foreign Application Priority Data

Apr. 7, 1999 (ES) ................................................ 9900692

(51) Int. Cl.[7] ................................................ B08B 3/04
(52) U.S. Cl. ........................ 134/68; 134/73; 134/131; 134/122 R
(58) Field of Search ................................. 15/3.13, 3.14, 15/3.15; 134/66, 68, 73, 122 R, 126, 127, 131, 72

(56) References Cited

U.S. PATENT DOCUMENTS

| | | | | |
|---|---|---|---|---|
| 1,561,043 A | * | 11/1925 | Zuckerman |
| 1,583,034 A | * | 5/1926 | Valerius et al. |
| 1,674,064 A | * | 6/1928 | Ridley |
| 1,705,544 A | * | 3/1929 | Schmidt |
| 1,710,357 A | * | 4/1929 | Grunwald |
| 1,846,703 A | * | 2/1932 | Wiener |
| 2,041,765 A | * | 5/1936 | Howell |
| 2,074,788 A | * | 3/1937 | Holloman et al. |
| 2,086,181 A | * | 7/1937 | Bonotto |
| 2,108,290 A | * | 2/1938 | Levin et al. |
| 2,114,893 A | * | 4/1938 | Webb |
| 2,175,677 A | * | 10/1939 | Zademach |
| 2,191,296 A | * | 2/1940 | Kleine et al. |
| 2,249,792 A | * | 7/1941 | Skinner |
| 2,593,311 A | * | 4/1952 | Johnson et al |
| 2,633,437 A | * | 3/1953 | Detjen |
| 2,698,627 A | * | 1/1955 | Kearnry et al. . |
| 2,926,674 A | * | 3/1960 | Umbricht et al. |
| 3,056,414 A | * | 10/1962 | Nolte |
| 3,106,925 A | * | 10/1963 | Rand |
| 3,144,872 A | * | 8/1964 | Kearney |
| 3,483,877 A | * | 12/1969 | Naslund |
| 3,683,945 A | * | 8/1972 | Weisser |
| 3,796,186 A | * | 3/1974 | Bounds et al. |
| 3,836,000 A | * | 9/1974 | Jakubek |
| 4,055,246 A | * | 10/1977 | Zalewski |
| 4,097,306 A | * | 6/1978 | Carman |
| 4,102,350 A | * | 7/1978 | Chelton et al. |
| 4,231,806 A | * | 11/1980 | Henry |
| RE30,977 E | * | 6/1982 | Zecher |
| 4,381,793 A | * | 5/1983 | Ishii et al. |
| 4,844,106 A | * | 7/1989 | Hunter et al. |
| 4,858,769 A | * | 8/1989 | DeVries |
| 5,538,747 A | * | 7/1996 | Mueller |
| 5,630,435 A | * | 5/1997 | Brouchoud et al. |
| 5,778,907 A | * | 7/1998 | Ransley, Jr. et al. |

FOREIGN PATENT DOCUMENTS

| | | | |
|---|---|---|---|
| IT | 485065 | * | 9/1953 |
| NO | 25816 | * | 4/1915 |

* cited by examiner

Primary Examiner—Frankie L. Stinson
(74) Attorney, Agent, or Firm—Oblon, Spivak, McClelland, Maier & Neustadt, P.C.

(57) ABSTRACT

A machine for washing scraps of fibrous material where the fibrous material has been impregnated with resin, and the machine extracts the resin via the use of appropriate solvents. The machine includes a closed, hollow container having an inlet and an outlet. The container encloses at least one conveyor belt. At least one overhead spraying device is situated over the conveyor belt. The overhead spraying device delivers solvent which is contained in at least one solvent tank. A drying device is installed at the finishing end of the conveyor belt so as to be upstream of the outlet of the container. A process is also provided for washing scraps of fibrous material impregnated with resin. The process includes the steps of feeding the scraps into a closed, hollow container, washing the scraps with at least one solvent spray, and drying the washed scraps inside of the container.

11 Claims, 3 Drawing Sheets the spraying machines spray solvent on the scrap placed on the belts thus, dissolving the resin, and the washed scraps are then dried inside of the container to prevent any flow of solvent vapor out of the container.

MACHINE USABLE FOR WASHING SCRAPS OF FIBROUS MATERIAL, WHICH HAVE BEEN IMPREGNATED WITH RESIN

BACKGROUND OF THE INVENTION

1. Field of the Invention

The present invention generally relates to a machine for washing scraps of fibrous materials, and more particularly, to a machine for washing scraps of fibrous material impregnated with resin so that the resin may be extracted with the use of appropriate solvents.

2. Discussion of Background

The use of fibrous materials such as fiberglass, carbon fiber, polyamide, or similar materials, that have been steeped in resin is common in the manufacture of numerous elements. In one known process, a thermostable matrix is placed on a mold surface and impregnated with resins. The resins are subsequently hardened, affording rigidity to the whole. The process gives rise to a light product with enough resistance for it to be suitable for various industrial purposes, among which are those concerned with the manufacture of containers capable of holding corrosive liquids.

Also quite frequent is the incorporation of reinforcements of fiberglass, carbon fiber, polyamide staple, and similar materials in the thermostable matrix, with an aim to affording sufficient structural rigidity for certain industrial purposes.

There exists fiberglass pre-impregnated with resins that facilitates the manufacturing process of components by means of the above-described process.

The manufacture of elements using fiberglass, carbon fiber, polyamide, or similar materials, placed on a mold and subsequently impregnated with resin, or using fiberglass preimpregnated with resin, generates a considerable amount of scrap, due to the need to cut the required shapes from the industrial fibrous sheets, especially fiberglass sheets, which are usually rectangular in shape.

The scraps from fiberglass, carbon fiber, polyamide, or similar materials, which have been impregnated with resin, form toxic waste which it is desirable to make inert. On the other hand, the possible separation of the resin from the thermostable matrix would allow the latter to be subsequently re-used and the reinforcements optionally present to be recovered.

It is known to separate the thermostable matrix from the resin it has been impregnated with, by washing with appropriate solvents, thus achieving one of the above-described objectives.

For ecological reasons and for reasons of economy in the industrial process involved in the manufacture of components with fiberglass, carbon fiber, polyamide, or similar materials pre-steeped in resin, an industrial machine which could carry out the above-described process is desirable. The applicant is unaware of the existence of any such machine to be used for such purposes.

SUMMARY OF THE INVENTION

The above-described object has been achieved by a machine including a closed, hollow container having one inlet and one outlet, the container enclosing at least one conveyor belt over which is situated at least one tank, wherein a drying means is installed at the end of the conveyor belt upstream of the output of the container.

The scraps are fed at the end of the conveyor belt located at the inlet of the container. The spraying machine sprays or the spraying machines spray solvent on the scrap placed on the belts thus, dissolving the resin, and the washed scraps are then dried inside of the container to prevent any flow of solvent vapor out of the container.

In a preferred embodiment, the machine includes a plurality of conveyor belts arranged in series over which a plurality of overhead spraying nozzles are situated. The conveyor belts are preferably inclined and drive the belt in the upper direction, in such a way that the upper end of a first conveyor belt feeds the lower end of the downstream conveyor belt.

In a most preferred embodiment, the machine includes a first washing section with a first belt section, optionally including a plurality of conveyors arranged in series, situated above a first tank formed by internal walls of the bottom part of the container, and at least a second washing section with a second belt section arranged in series with the first one, optionally including a plurality of conveyors, situated above a second tank formed by internal walls of the bottom part of the container and separated from the first one, an overhead spraying device being located above each of the conveyor belt sections. The shape of the bottom tanks is a parallelpiped.

Separation of the resins from the scraps of fibrous materials is achieved by the spray of solvent dissolving the resins, the used solvent being collected and subsequently stored in the tanks preferably placed for that purpose within the container.

The flow of solvent from the overhead spray machines is re-circulated from the tanks for that purpose within the container. The tank situated directly under the first conveyor belt section feeds the overhead spray machines that wash the conveyor belt or belts, while the scrap on the second conveyor belt section is washed by means of the solvent supplied by the tank for that purpose situated under the second section.

The possible loss of washing solvent is rectified by means of the addition of clean solvent to the process from a tank connected to the re-circulation circuit by suitable means.

In a preferred embodiment, the resin floating in the tank containing the solvent for washing the scrap in the downstream washing section or sections can be periodically transferred to a tank upstream, via an appropriate valve, thus completing the washing process carried out by the overhead spray machines situated over the first conveyor belt section and keeping the washing solvent for the downstream section in optimum condition.

At the end of the run of the last conveyor belt, there is a drying machine, preferably an air drying machine, which generates a flow of air fed by a suitable air-compressing generator. The drying machine is advantageously made up of the necessary pipes and diffusers which circulate a fixed flow of pressurized air over the scrap moving along the conveyor belts.

The speed of the process as well as the temperature of the solvents and the nature of the same depend on the characteristics of the solvents and the properties of the scrap itself. The variables can be modified by manipulating a control panel of the present invention.

Also subject matter of the present invention is a process for washing scraps of fibrous materials, wherein the scraps are fed in a closed hollow container and washed with at least one solvent spray and finally dried within the container.

Preferable steps of the process include: circulating the scraps inside of the container on at least one conveying belt;

collecting the resin-loaded solvent, advantageously under the conveyor belt or belts, and re-circulating it to the spraying means; circulating the scraps along a plurality of washing sections each having its own solvent source tank; transferring the resin floating on the surface of the solvent in the solvent tank of a downstream section to the solvent tank of an upstream section; and detecting the loss of solvent in the container, in any washing section, and adding clean solvent to set the solvent quantity to a predetermined value.

The machine and process of the present invention are capable of separating the thermostable matrix and/or the reinforcements of fibrous scraps including, for instance, fiberglass, carbon fiber, polyamide, or similar materials impregnated with the resin, the toxic waste generated being made inert to a satisfactory degree and the possible subsequent re-use of the thermostable matrix as well as the reinforcements existing in the scraps. Moreover, the machine and process enable the amount of thermostable matrix contained in the final waste from the manufacturing process to be reduced.

The invention can be used in those industries involved in the manufacture of machinery to be used in industries dealing with the manufacture of components and machines with fiberglass, carbon fiber, polyamide staple, or similar materials, as well as in those activities related to the manufacture of machinery to be used in the recycling of industrial waste.

The invention can be suitably designed to ensure the total or partial recycling of the fiberglass, carbon, polyamide, or similar scraps impregnated with resin, thus leading to the recovery of a thermostable matrix and/or reinforcements made up of fiberglass, carbon fiber, polyamide staple, or similar materials, and likewise causing toxic waste generated during the manufacture of components and machines with these materials to be made inert and during the reduction of a thermostable matrix into fibrous materials.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
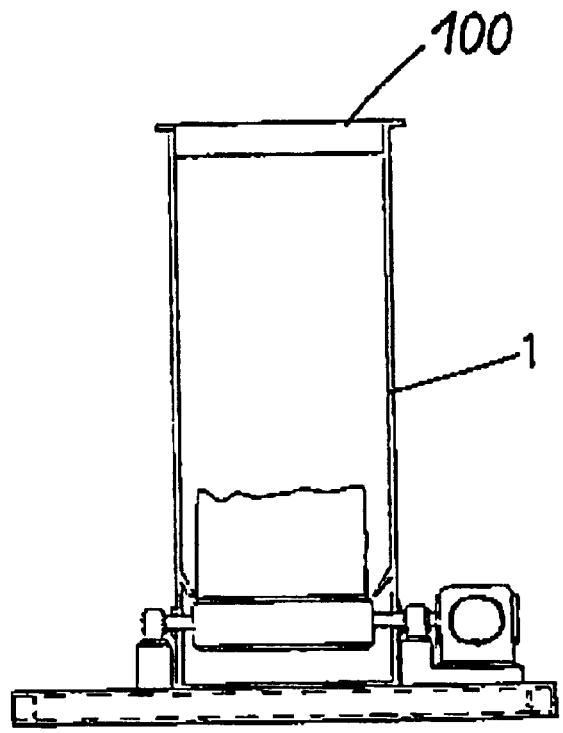
FIG. 3 shows a cross-section of the machine of FIG. 1 taken along line III—III of FIG. 1.
Figure 4:
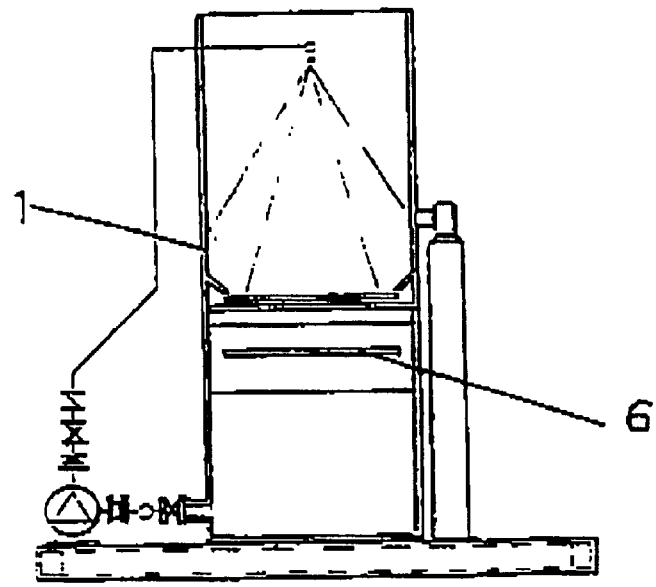
FIG. 4 shows a cross-section of the machine of FIG. 1 taken along line IV—IV of FIG. 1.

With the aid of the figures accompanying the present description, one can appreciate that this machine, suitable for washing scraps of fibrous materials, such as fiberglass, carbon fiber, polyamide, or similar materials, which have been impregnated with resin, is made up of a closed, hollow container 1 whose cover 20 includes one inlet 100 and one outlet 200. The container 1 houses three conveyor belts 5, 6, and 7, which are arranged in series. Three overhead spray machines 8, 9, and 10 are situated over the three conveyor belts 5, 6, and 7, respectively. The overhead spray machines 8, 9, and 10 spray solvent driven by means of pumps 14 and 15 from two tanks created in the container 1 by partitions 2. The conveyor belts 5, 6, and 7 are driven by driving means as can be seen in FIG. 3.

The first two conveyor belts 5 and 6 are above tank 3, together with spraying machine 8 and 9, to make up a first washing section, while the third conveyor belt 7 is situated above the tank 4, together with spraying means 10, to make up a second washing section.

Figure 2:
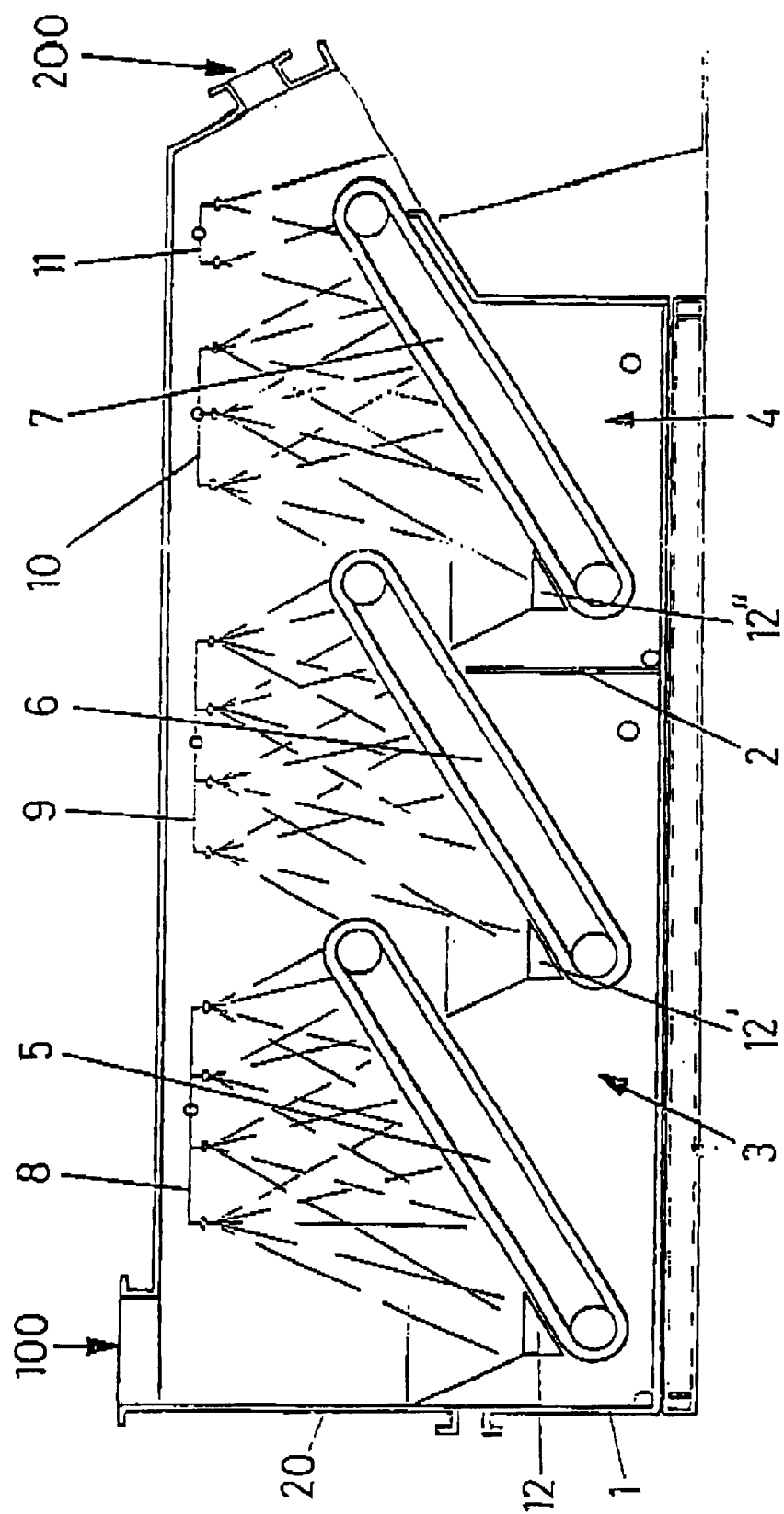
FIG. 2 shows a longitudinal cross-section of the machine of FIG. 1 taken along line II—II of FIG. 1.

A drying machine 11, which generates a flow of air, is situated at a finishing end of the conveyor belt 7 as depicted in FIG. 2. It is fed by means of a conventional generator of compressed air.

The conveyor belts 5, 6, and 7 are preferably not perforated and incorporate split flaps for dragging. They are made of a material capable of preventing corrosion caused by a continuous dip of solvents like spirits, ketones, or even water, at a wide range of temperatures. There are shutting or closing mechanisms 12, 12', and 12" situated at the head or leading end of the conveyor belts 5, 6, and 7 as depicted in FIG. 2, which prevent the solids from being dragged by the flow of washing solvent down to the bottom of the container 1. The container 1 is preferably made of fire-proof polypropylene.

Figure 1:
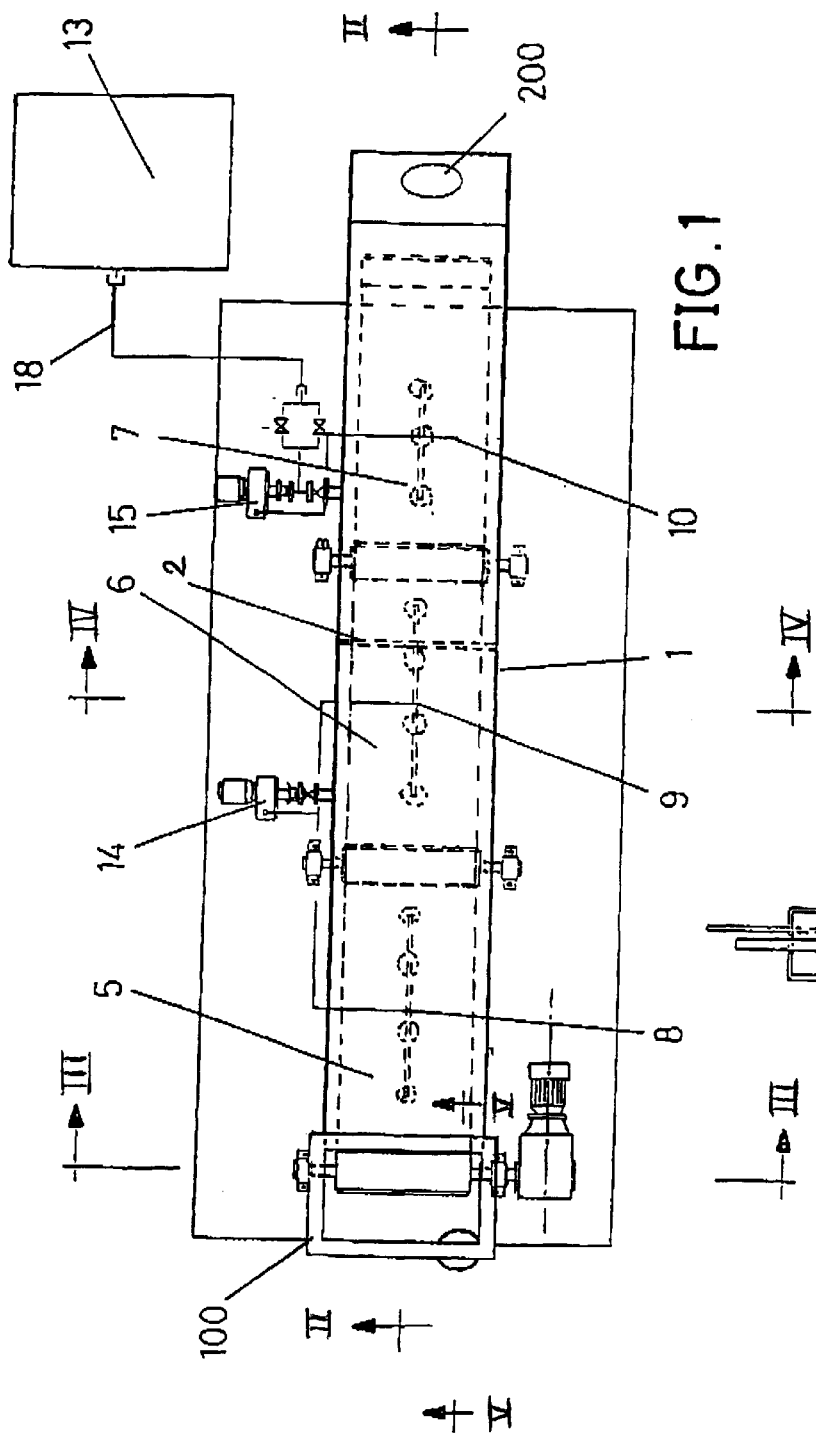
FIG. 1 shows a view of a machine according to the present invention.
Figure 5:
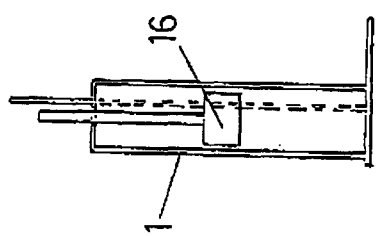
FIG. 5 shows a longitudinal cross-section of the machine of FIG.1 taken along line V—V of FIG. 1.

The resin floating on the surface of the second tank 4 in the container 1 is periodically transferred to the tank 3 by means of an appropriate valve, thus ensuring that the solvent from the tank 4, which feeds the spray machine 10, is in optimum condition. FIG. 5 reveals the presence of a float 16 in the tank within the container on which the invention rests. The float regulates the entry of clean solvent from the tank 13 adjacent to the container 1. The loss of solvent, detected by the float 16 and the appropriate electronic circuit control, is rectified by adding clean solvent contained in the tank 13, situated adjacent to the container 1, and linked to the spray machine 10 by means of a pipe 18.

The invention has a control panel which allows variables such as the speed of the conveyor belts 5, 6, and 7 and the temperature of the solvent to be modified.

It is not considered necessary to expand on this description in order for any expert in the field to understand the scope of the present invention and the advantages deriving from it.

The materials, shape, size, and arrangement of the components can be changed whenever it does not imply a change to the essence of the invention.

The terms in which this descriptive account has been written should be taken in a broad rather than a limiting sense.

Numerous variations of the present invention are possible in light of the above teachings. It is therefore to be understood that within the scope of the appended claims, the present invention can be practiced other than as specifically described herein.

We claim:

1. A machine for washing scraps of fibrous material impregnated with resin, said machine comprising:

a closed, hollow container having an inlet and an outlet;

at least a first conveyor belt and a second conveyor belt arranged in series, enclosed within said container;

at least a first solvent tank and a second solvent tank;

at least a first overhead spraying device and a second overhead spraying device, respectively fluidically connected to said first and second solvent tanks, and situated over said first conveyor belt and said second conveyor belt, respectively, and configured to spray materials situated on said first and said second conveyor belts with solvents from said first and second solvent tanks, respectively; and a drying device installed at a finishing end of said at least one conveyor belt and upstream from said outlet of said container, wherein said machine further comprises a valve configured to transfer resin floating on a surface of said second solvent tank within said container to said first solvent tank.

2. The machine of claim 1, wherein said first or said second solvent tank is created by a partition in a bottom part of said container.

3. The machine of claim 2, wherein said first or said second convey belt is not perforated and incorporates split flaps for dragging.

4. The machine of claim 1, wherein said first or said second conveyor belt is not perforated and incorporates split flaps for dragging.

5. The machine of claim 1, wherein said first or said second conveyor belt is made of a material capable of preventing corrosion generated by a continuous dip of solvent at a wide range of temperatures, said solvent being any one of spirits, ketones, and water.

6. The machine of claim 5, further comprising a control panel for controlling a speed of said at least one conveyor belt and a temperature of the solvent.

7. The machine of claim 1, further comprising a closing mechanism situated at a leading end of a said first or said second conveyor belt to prevent solids from being dragged to the container by flow of said solvent to said container.

8. The machine of claim 1, further comprising a float and an electronic circuit control configured to detect a loss of said solvents from said first solvent or said second solvent tank, and a third solvent tank placed adjacent to said container, said third solvent tank being connected to said first or said second overhead spraying device via a pipe, said electronic circuit control being configured to control rectification of the loss detected by controlling addition of another solvent in the third solvent tank to said first solvent or said second solvent tank.

9. A machine for washing scraps of fibrous material impregnated with resin, said machine comprising:

a closed, hollow container.having an inlet and an outlet;

at least one conveyor belt enclosed within said container;

at least one solvent tank;

at least one overhead spraying device situated over said at least one conveyor belt, wherein said at least one spraying device is configured to deliver solvent contained in said at least one solvent tank;

a drying device installed at a finishing end of said at least one conveyor belt and upstream from said outlet of said container, wherein said at least one tank includes a first tank and a second tank, and said machine further comprises a valve configured to transfer resin floating on a surface of said second tank within said container to said first tank; and a float and an electronic circuit control configured to detect a loss of said solvent from said at least one tank, and a third tank placed adjacent to said container, said third tank being connected to said at least one overhead spraying device via a pipe, said electronic circuit control being configured to control rectification of the loss detected by controlling addition of a second solvent in the third tank to said at least one tank.

10. A machine for washing scraps of fibrous material impregnated with resin, said machine comprising:

a closed, hollow container having an inlet and an outlet;

at least a first conveyor belt and a second conveyor belt arranged in series, enclosed within said container;

at least a first solvent tank and a second solvent tank;

at least a first overhead spraying device and a second overhead spraying device, respectively fluidically connected to said first and second solvent tanks, and situated over said first conveyor belt and said second conveyor belt, respectively, and configured to spray materials situated on said first and said second conveyor belt with solvents from said first and second solvent tanks, respectively; and a drying device installed at a finishing end of said at least one conveyor belt and upstream from said outlet of said container, wherein said first or said second belt is not perforated and incorporates split flaps for dragging.

11. A machine for washing scraps of fibrous material impregnated with resin, said machine comprising:

a closed, hollow container having an inlet and an outlet;

at least a first conveyor belt and a second conveyor belt arranged in series, enclosed within said container;

at least a first solvent tank and a second solvent tank;

at least a first overhead spraying device and a second overhead spraying device, respectively fluidically connected to said first and second solvent tanks, and situated over said first conveyor belt and said second conveyor belt, respectively, and configured to spray materials situated on said first and said second conveyor belt with solvents from said first and second solvent tanks, respectively; and a drying device installed at a finishing end of said at least one conveyor belt and upstream from said outlet of said container, wherein said at least one solvent tank is created by a partition in a bottom part of said container, wherein said first or said second conveyor belt is not perforated and incorporates split flaps for dragging.

* * * * *